United States Patent
Mujica et al.

(10) Patent No.: US 7,130,345 B2
(45) Date of Patent: Oct. 31, 2006

(54) CONFIGURABLE EQUALIZATION APPARATUS FOR MULTICARRIER COMMUNICATIONS

(75) Inventors: Fernando A. Mujica, Allen, TX (US); Arthur John Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 754 days.

(21) Appl. No.: 10/251,733

(22) Filed: Sep. 20, 2002

(65) Prior Publication Data

US 2005/0084005 A1 Apr. 21, 2005

Related U.S. Application Data

(60) Provisional application No. 60/351,429, filed on Jan. 28, 2002, provisional application No. 60/342,399, filed on Dec. 27, 2001.

(51) Int. Cl.
*H03H 7/30* (2006.01)

(52) U.S. Cl. ..................................... 375/235; 375/229
(58) Field of Classification Search ................ 375/235, 375/234, 229
See application file for complete search history.

(56) References Cited

U.S. PATENT DOCUMENTS 6,687,291 B1 * 2/2004 Lee et al. .................... 375/229

* cited by examiner

*Primary Examiner*—Mohammed Ghayour
*Assistant Examiner*—Leila Malek
(74) *Attorney, Agent, or Firm*—W. James Brady, III; Frederick J. Telecky, Jr.

(57) ABSTRACT

A number of basic equalization and demodulation structures have been shown to be appropriate for DMT systems depending on the channel, noise, and system parameters. These include single path, dual path, oversampled, and double rate structures. Using the fundamental computation units of two TEQs (FIR filters) and two FFTs, in conjunction with simple delays, downsampling and routing, single path, dual path, oversampled and double rate equalization structures can be realized from a common equalization structure.

2 Claims, 2 Drawing Sheets

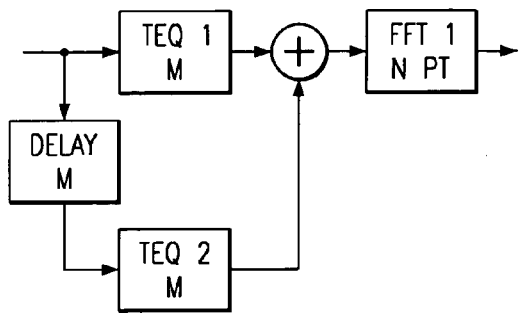
FIG. 1
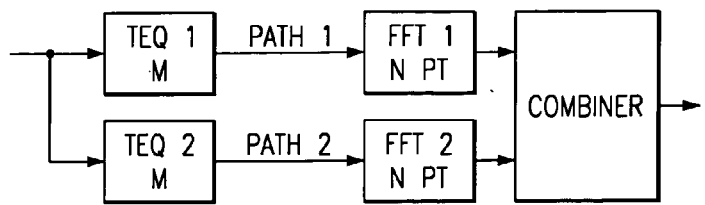
FIG. 2

FIG. 4
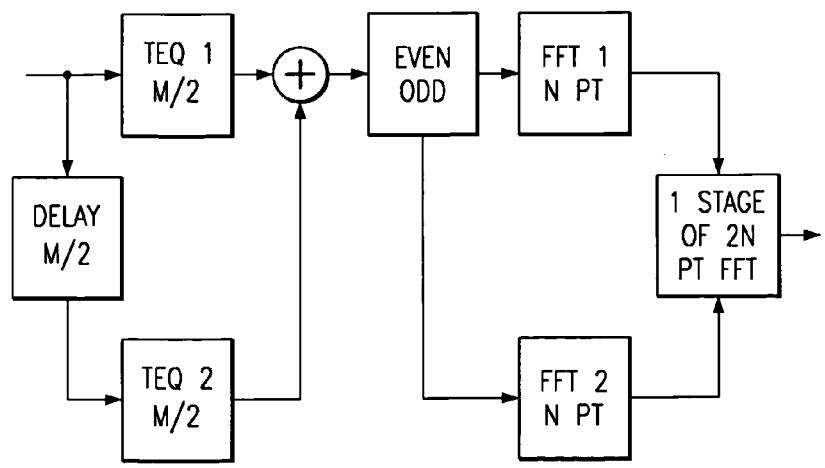

CONFIGURABLE EQUALIZATION APPARATUS FOR MULTICARRIER COMMUNICATIONS

CROSS-REFERENCES TO RELATED APPLICATIONS

This application claims priority under 35 USC § 119(e)(1) of provisional application Nos. 60/342,399 filed Dec. 27, 2001 and 60/351,429 filed Jan. 28, 2002.

FIELD OF INVENTION

This invention relates to multicarrier communication systems and more particularly to a configurable equalization apparatus.

BACKGROUND OF GROUND

Telephone wires connect homes and businesses to service providers and telephone companies. In many cases, these wires are able to support data rates between the user and service provider which allows for services such as internet access, video, and digital telephony.

Asymmetrical digital subscriber line (ADSL) is a common digital subscriber line (DSL) specification which allows for the transport of data over telephone wires. ADSL uses discrete multitone (DMT) modulation, a form of multicarrier modulation, to effectively divide a channel into a number of parallel subchannels, each of which can be optimized to maximize the overall data rate.

DMT allows for simple frequency-domain equalization if the memory of the channel does not extend past the length of the prefix. The prefix of a DMT symbol is formed by appending the last P samples of the fast Fourier transform (FFT) of the data to the beginning. However, for many practical systems (ADSL included), the channel memory is longer than the prefix. To address this, a time-domain equalizer (TEQ), usually a filter, is typically used to effectively shorten the overall channel (channel plus TEQ) such that the overall channel memory is less than or equal to the prefix length.

Because of the wide variety of channels and noise environments encountered in ADSL deployments, it is difficult to design a single TEQ structure which appropriately shortens all channels and allows for near capacity data rates with reasonable complexity.

SUMMARY OF INVENTION

In accordance with an embodiment of the present invention a configurable equalization apparatus is provided that can be configured for multiple TEQ and demodulation topologies.

In accordance with an embodiment of the present invention a flexible equalization apparatus is provided that can be configured in single path, dual path, oversampled, and double rate topologies.

DESCRIPTION OF DRAWINGS

FIG. 1 illustrates a single path equalization architecture using a length 2M TEQ formed from two length M TEQs and a N point FFT.

FIG. 2 illustrates a dual path equalization architecture using two length M TEQs and two N point FFTs.

FIG. 4 illustrates a double rate equalization architecture using a length M TEQ formed from two length M/2 TEQs and a 2 N point FFT formed from two N point FFTs.

DESCRIPTION OF PREFERRED EMBODIMENT OF THE PRESENT INVENTION

A number of basic equalization and demodulation structures have been shown to be appropriate for DMT systems. These include single path, dual path, oversampled, and double rate structures. The appropriateness of the different structures depends on the channel and noise conditions, as well as the system parameters.

Using the fundamental computation units of two TEQs and two FFTs, in conjunction with simple delays, downsampling and routing, single path, dual path, oversampled and double rate equalization structures can be realized from a common equalization structure.

Single Path Equalization

For a number of channels, a single long TEQ followed by a FFT is the appropriate equalization structure for DMT. By using a delay and combining the outputs of two TEQ blocks, a length 2M TEQ can be realized from two length M TEQs. Note that only one FFT is required. FIG. 1 shows a block diagram of the single path equalization architecture.

Dual Path Equalization

A dual path equalization architecture is described in connection application provisional Ser. No. 60/342,618 filed Dec. 27, 2001, entitled "Dual Path Equalization for Multicarrier Systems"). A second provisional application entitled "Multiple Path Equalization for Multicarrier Systems" is being filed on the same date as the present application. These applications are incorporated herein by reference. A dual path equalization architecture allows the equalization structure to be optimized for different parts of the communication channel. For multicarrier systems such as ADSL, this allows one equalizer to be optimized for the part of the channel near the transition band (where high ISI and echo dominate performance) and a second equalizer to be optimized for the remainder of the channel (where mild ISI, low echo, and possible RFI dominate performance).

FIG. 2 shows a block diagram of a dual path equalization architecture for multicarrier systems. For an ADSL system the first path is designed to optimize performance near the transition band, and the second path is designed to optimize performance for the remainder of the band. Outputs of the two paths are combined to maximize the signal to noise ratio (and data rate).

Oversampled Equalization

Figure 3:
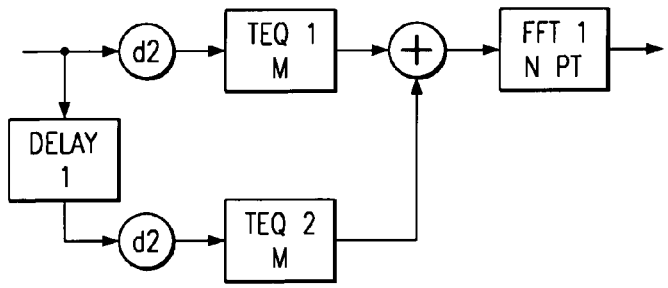
FIG. 3 illustrates an oversampled equalization architecture using two length M TEQs and a N point FFT.

If the input samples arrive at twice the required sampling rate and there is excess bandwidth in the channel, then using an oversampled (fractionally spaced) TEQ allows for perfect channel shortening TEQ designs. FIG. 3 shows a block diagram of an oversampled equalizer architecture. The circuit includes two down samplers d2 performing downsampling by 2 operation before each of the TEQs. While the input to the equalization block is at twice the required sampling rate, the inputs to the TEQs and the output of the equalization block are at the required sampling rate. As in the case of the single path equalizer structure, only one FFT is required.

Double Rate Equalization

Define ADSL+ as a method for achieving higher data rates in ADSL systems by doubling the number of subchannels. For ADSL+, the input to the two TEQs is at twice the typical ADSL rate, so they need to be halved in length to maintain the same computational requirements. However, as in the case of the single path equalizer, the two length M/2 TEQs can be combined to form a single length M TEQ.

By routing the even samples to one N point FFT, the odd samples to a second N point FFT, and adding a single stage of a 2N point FFT, a full 2N point FFT can be realized. FIG. 4 shows a block diagram of the double rate equalization architecture.

Common Equalization Architecture

Figure 5:
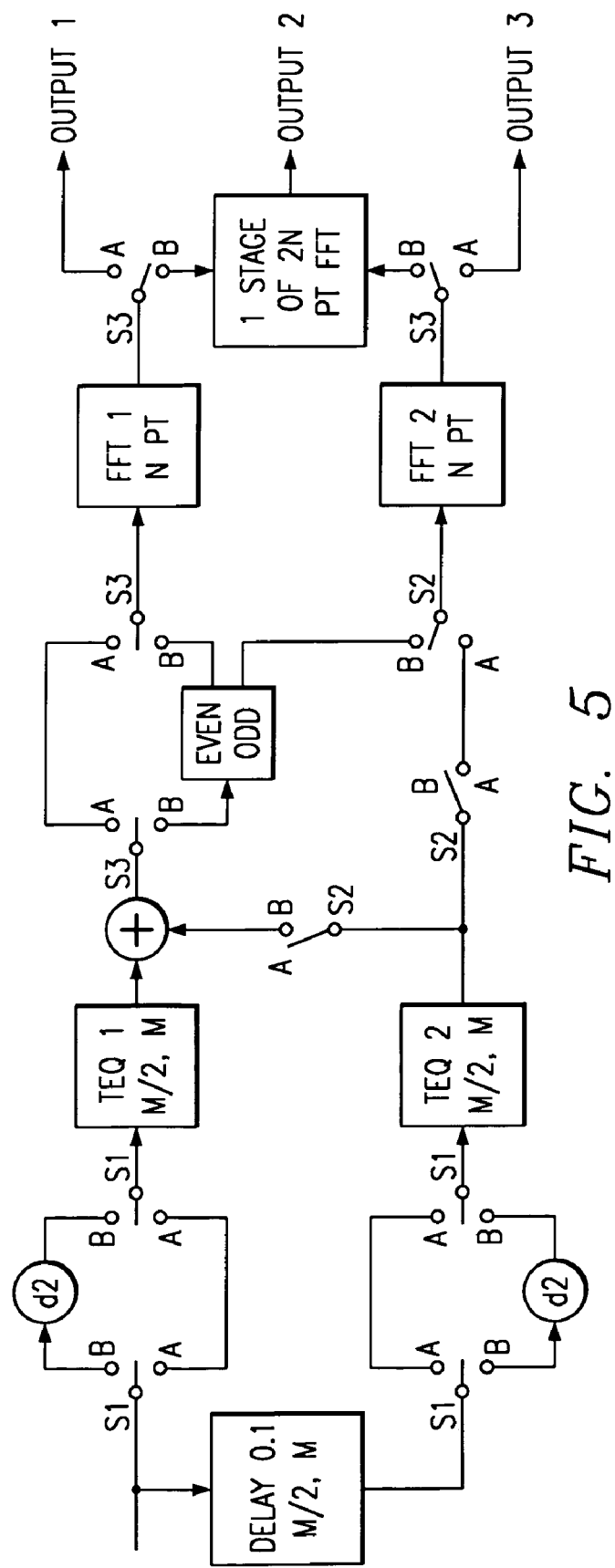
FIG. 5 illustrates a general equalization structure capable of implementing single path, dual path, oversampled and double rate equalization architectures according to one embodiment of the present invention.

The single path, dual path, oversampled, and double rate equalization structures can be formed from a common set of two TEQs and two FFTs with the addition of simple delays, downsampling, and routing. FIG. 5 and Table 1 show how these can be combined into a single structure that can be configured to handle all of the equalization options.

The routing is controlled by switches S1, S2 and S3 switches that can be set to positions A or B to achieve the routing following Table 1. Downsampling by 2 operation is performed at d2.

The delay is selectable between 0,1, M/2 and M samples. The TEQs are selectable in length between M/2 and M. There is selectable coupling of the outputs of the TEQs to the input of the N point FFTs. There is also a selectable coupling of the outputs of the N point FFTs to an additional 2N point FFT stage.

Note that in cases where only one FFT is required (the single path and oversampled cases), time-domain samples (i.e., without the FFT) can be routed on the second path such that both time-and frequency-domain samples are available to the receiver.

The computational complexity for each of these equalization structures is bound by the double rate structure (which requires an additional 2N point FFT stage). However, the complexity is almost identical for the dual path, and only slightly less for the single path and oversampled cases (which require one less FFT). The result is a clean implementation and high system utilization for four different structures using the same basic TEQ and FFT components with the addition of simple delays, downsampling, and routing.

TABLE 1

Switch, delay, TEQ length, and output settings for FIG. 5 for the different equalization options.

| Option | S1 | S2 | S3 | Delay | TEQ Length | Output |
|---|---|---|---|---|---|---|
| Dual Path | A | A | A | 0 | M | 1 and 3 |
| Single Path | A | B | A | M | M | 1 |
| Oversampled | B | B | A | 1 | M | 1 |
| Double Rate | A | B | B | M/2 | M/2 | 2 |

The invention claimed is:

1. A configurable equalization apparatus for providing equalization topologies for single path, dual path , oversampled and double rate for multicarrier communications comprising:

selectable routing circuitry for multiple equalization topologies;
selectable delay that is selectable between 0, 1, M/2 and M samples;
two down sampling by 2 circuits(d2)
a summing circuit;
two time domain equalizers (TEQs) of selectable lengths of M/2 and M;
two N point Fast Fourier Transforms (FFTs); and
a 2N point FFT; said selectable routing circuitry, said selectable delay and said TEQs being in a first selectable routing position and delay position providing a single path equalization provided by the selectable delay being at M samples, TEQs at length M and the outputs of the TEQs being summed at the summer circuit and applied to one N point FFT, said selectable routing circuitry, said selectable delay and said TEQs being in a second position such that a dual path equalization is provided by the delay being at 0, the TEQs at length M and a first of the TEQs applied to a first of the FFTs and a second of the TEQs applied to the a second of the FFTs, said selectable routing circuitry, said selectable delay and said TEQs being in a third position for oversampled equalization with a one sample delay between the two down sampling by 2 with a first of the down sampling by 2 applied to a first of the TEQs at delay M samples and a second of down sampling by 2 applied to the second of the TEQs at delay M samples and the outputs of the TEQs summed at the summing circuit and the sum applied to one of said N point FFTs, and said selectable routing circuitry, said selectable delay and said TEQs being in a fourth position for double rate equalization by the delay between the input to the TEQs being at length M/2, the TEQs at length M/2 and the outputs of the TEQs being summed at the summer circuit with the summed output alternately applied to the two N point FFTs and even sample outputs from the one of the two N point FFTs being applied to said 2N point FFT and odd sample outputs from the other of said two N point FFTs being applied to said 2N point FFT and the samples combined at the 2N point FFT.

2. A configurable equalization apparatus for providing equalization topologies for single path, dual path, oversampled and double rate for multicarrier communications comprising:

selectable routing circuitry for multiple equalization topologies including three bipolar single pole multi-throw switches S1,S2, and S3 "each of the three switches can take either positions A or B";
selectable delay that is selectable between 0, 1, M/2 and M samples;
two down sampling by 2 circuits(d2);
a summing circuit;
an even/odd separation circuit;
two_time domain equalizers (TEQs) of selectable lengths of M/2 and M;
two N point Fast Fourier Transforms (FFTs); and
a 2N point FFT; said selectable routing circuitry, said selectable delay and said TEQs being in selectable routing position A for switch S1, B for switch S2 and A for switch S3, and delay position providing a single path equalization provided by the selectable delay being at M samples, the TEQs at length M and the outputs of the TEQs are summed at the summer circuit and applied to one N point FFT, said selectable routing circuitry, said selectable delay and said TEQs being in selecting routing position A for switch S1, A for switch S2 and A for switch S3, such that a dual path equalization is provided by the delay being at 0, the TEQs at length M and a first of the TEQs applied to a first of the FFTs and a second of the TEQs applied to the a second of the FFTs, said selectable routing circuitry, said selectable delay and said TEQs being in selecting routing position B for switch S1, B for switch S2 and A for switch S3 for oversampled equalization with said delay being one sample delay between the two down sampling by 2 with a first of the down sampling by 2 applied to a first of the TEQs being at M and a second of down sampling by 2 applied to the second of the TEQs being at M and the outputs of the TEQs are summed at the summing circuit and the even samples of the sum applied to one of said N point FFTs; and said selectable routing circuitry, said selectable delay and said TEQs being in selectable routing position A for switch S1, B for switch S2 and B for switch S3 for double rate equalization by the delay between the input to the TEQs being at length M/2, the TEQs at length M/2 and the outputs of the TEQs being summed at the summer circuit with the even samples applied to a first of said two N point FFTs and odd samples applied to a second of the two N point FFTs and the outputs from the N point FFTs being combined at the 2N point FFT.

* * * * *